(12) United States Patent
Raman et al.

(10) Patent No.: US 12,488,301 B2
(45) Date of Patent: Dec. 2, 2025

(54) METHOD AND SYSTEM FOR AUTOMATED SCORING OF DEVELOPMENT TASKS BY USING ARTIFICIAL INTELLIGENCE

(71) Applicant: JPMorgan Chase Bank, N.A., New York, NY (US)

(72) Inventors: Pranav Raman, Hoffman Estates, IL (US); Terrence Cook, Country Club Hills, IL (US); Nitin Challa, Aurora, IL (US); Grace Kim, Chicago, IL (US); Caleb McClatchey, Ellicott City, MD (US); Venkatraghavan Kannan, Novi, MI (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 147 days.

(21) Appl. No.: 18/379,402

(22) Filed: Oct. 12, 2023

(65) Prior Publication Data

US 2025/0124389 A1   Apr. 17, 2025

(51) Int. Cl.
*G06Q 10/0639* (2023.01)
*G06Q 10/0631* (2023.01)
*G06Q 10/10* (2023.01)

(52) U.S. Cl.
CPC ........... *G06Q 10/06393* (2013.01); *G06Q 10/063114* (2013.01); *G06Q 10/103* (2013.01)

(58) Field of Classification Search
CPC ..... G06Q 10/06393; G06Q 10/063114; G06Q 10/103
See application file for complete search history.

(56) References Cited

U.S. PATENT DOCUMENTS

| | | | |
|---|---|---|---|
| 8,843,878 B1 * | 9/2014 | Grundner | G06Q 10/0631 717/124 |
| 9,313,676 B2 * | 4/2016 | Venezia | H04W 24/04 |
| 9,383,976 B1 * | 7/2016 | Singh | H04L 12/1822 |
| 10,546,102 B2 * | 1/2020 | Attanapola | G16H 20/40 |
| 12,086,530 B1 * | 9/2024 | Smith | G06F 40/10 |

(Continued)

FOREIGN PATENT DOCUMENTS

CA   3078935 C   *   8/2023   ............... G06F 8/60

OTHER PUBLICATIONS

Job "Automating and Optimizing Software Testing using Artificial Intelligence Techniques" (2021) (https://thesai.org/Downloads/Volume12No5/Paper_71-Automating_and_Optimizing_Software_Testing.pdf) (Year: 2021).*

*Primary Examiner* — Sujay Koneru (74) *Attorney, Agent, or Firm* — Greenblum & Bernstein, P.L.C.

(57) ABSTRACT

A method for facilitating automated scoring of software development tasks by using predictive analytics is disclosed. The method includes receiving, via a graphical user interface, search requests for various tasks; aggregating raw data that corresponds to the tasks, the raw data including information in a natural language format; generating structured data sets from the raw data based on predetermined parameters; determining, by using a first model, a task score for each of the tasks based on the structured data sets; determining, by using a second model, a confidence score for the task score; and computing predictive outputs for the tasks based on the corresponding task score and the corresponding confidence score.

20 Claims, 5 Drawing Sheets

(56) References Cited

U.S. PATENT DOCUMENTS

| | | | |
|---|---|---|---|
| 2010/0299650 A1* | 11/2010 | Abrahamsen | G06Q 10/10 |
| | | | 717/102 |
| 2012/0072334 A1* | 3/2012 | Feinstein | G06Q 40/03 |
| | | | 705/38 |
| 2016/0078773 A1* | 3/2016 | Carter | G09B 7/02 |
| | | | 434/353 |
| 2017/0046460 A1* | 2/2017 | Caplan | G16H 50/50 |
| 2017/0249580 A1* | 8/2017 | Newman | G06Q 10/1095 |
| 2018/0248904 A1* | 8/2018 | Villella | G06N 20/00 |
| 2019/0066016 A1* | 2/2019 | Ghosh | G06Q 10/0633 |
| 2019/0121855 A1* | 4/2019 | Alexander | G06F 16/248 |
| 2019/0244113 A1* | 8/2019 | Ramos | G06F 3/04847 |
| 2020/0074369 A1* | 3/2020 | Arcolano | G06N 7/01 |
| 2020/0394588 A1* | 12/2020 | Sanchez | G06F 8/75 |
| 2020/0402082 A1* | 12/2020 | Votava | G06F 16/9536 |
| 2021/0110822 A1* | 4/2021 | Pramanick | B25J 9/1661 |
| 2021/0209446 A1* | 7/2021 | Shi | G06N 3/08 |
| 2022/0164493 A1* | 5/2022 | Li | G06V 20/36 |
| 2022/0261668 A1* | 8/2022 | Stumpe | G06F 16/284 |
| 2022/0350307 A1* | 11/2022 | Osborne, Jr. | G05B 19/4155 |
| 2023/0016962 A1* | 1/2023 | Ramanna | G06F 40/47 |

\* cited by examiner

METHOD AND SYSTEM FOR AUTOMATED SCORING OF DEVELOPMENT TASKS BY USING ARTIFICIAL INTELLIGENCE

BACKGROUND

1. Field of the Disclosure

This technology generally relates to methods and systems for project management, and more particularly to methods and systems for enhancing project planning and execution by leveraging artificial intelligence to facilitate automated scoring of development tasks.

2. Background Information

Many business entities rely on various software solutions to facilitate business operations and provide services for users. Often, development of these software solutions is managed on development tracking platforms by using project management tools such as, for example, user stories. Historically, implementations of conventional scoring techniques for these project management tools have resulted in varying degrees of success with respect to efficient and objective assignment of points for corresponding development tasks.

One drawback of these conventional scoring techniques is that in many instances, development tasks are individually scored based on arbitrary criteria of each development team. As a result, assignment of points for the development tasks are inconsistent across large collections of software solutions. Additionally, due to the inconsistent scoring, the project management tools may be inefficiently utilized because accurate estimation of effort required for each of the development tasks is crucial for effective project planning and resource allocation.

Therefore, there is a need for an intelligent point estimation solution that leverages artificial intelligence, historical project data, and team performance data to facilitate automated scoring of development tasks to enhance project planning and execution.

SUMMARY

The present disclosure, through one or more of its various aspects, embodiments, and/or specific features or sub-components, provides, inter alia, various systems, servers, devices, methods, media, programs, and platforms for enhancing project planning and execution by leveraging artificial intelligence to facilitate automated scoring of development tasks.

According to an aspect of the present disclosure, a method for facilitating automated scoring of software development tasks by using predictive analytics is disclosed. The method is implemented by at least one processor. The method may include receiving, via a graphical user interface, at least one request, each of the at least one request may include a search request for at least one task; aggregating raw data that corresponds to the at least one task, the raw data may include information in a natural language format; generating at least one structured data set from the raw data based on at least one predetermined parameter; determining, by using a first model, at least one task score for each of the at least one task based on the at least one structured data set; determining, by using a second model, a confidence score for each of the at least one task score; and computing at least one predictive output for each of the at least one task based on the corresponding at least one task score and the corresponding confidence score.

In accordance with an exemplary embodiment, the method may further include generating at least one graphical element for the at least one predictive output, each of the at least one graphical element may relate to a graphical representation of the at least one predictive output; and displaying, via the graphical user interface, the at least one graphical element in response to the at least one request.

In accordance with an exemplary embodiment, prior to the computing of the at least one predictive output, the method may further include determining whether the confidence score satisfies a predetermined threshold; and identifying at least one set of adjacent scores based on an adjacency between each of the at least one task score, the at least one set of adjacent scores may be determined when the confidence score is less than the predetermined threshold.

In accordance with an exemplary embodiment, the method may further include determining, by using a third model, an adjacency probability value for each of the at least one set of adjacent scores; and computing the at least one predictive output for each of the at least one task based on the corresponding at least one task score, the corresponding confidence score, and the corresponding adjacency probability value.

In accordance with an exemplary embodiment, the at least one predictive output may include the at least one task score, the confidence score, the adjacency probability value, and reference data, the reference data may relate to contextual information for the at least one task score, the confidence score, and the adjacency probability value.

In accordance with an exemplary embodiment, each of the first model, the second model, and the third model may include at least one from among a large language model, a deep learning model, a neural network model, a natural language processing model, a machine learning model, a mathematical model, and a process model.

In accordance with an exemplary embodiment, to generate the at least one structured data set, the method may further include encoding the raw data to represent at least one categorical variable as a corresponding numerical value; vectorizing the encoded raw data into at least one number vector; scaling each of the at least one number vector to calculate a corresponding distance between a plurality of data points; and performing principal component analysis for each of the at least one scaled number vector.

In accordance with an exemplary embodiment, the at least one task may relate to a software development requirement that is written from a perspective of an end user, the software development requirement may include at least one subtask.

In accordance with an exemplary embodiment, the raw data may be aggregated from an issue tracking development platform, the raw data may include at least one from among historical project data, project attribute data, and team performance data.

According to an aspect of the present disclosure, a computing device configured to implement an execution of a method for facilitating automated scoring of software development tasks by using predictive analytics is disclosed. The computing device including a processor; a memory; and a communication interface coupled to each of the processor and the memory, wherein the processor may be configured to receive, via a graphical user interface, at least one request, each of the at least one request may include a search request for at least one task; aggregate raw data that corresponds to the at least one task, the raw data may include information in a natural language format; generate at least one structured data set from the raw data based on at least one predetermined parameter; determine, by using a first model, at least one task score for each of the at least one task based on the at least one structured data set; determine, by using a second model, a confidence score for each of the at least one task score; and compute at least one predictive output for each of the at least one task based on the corresponding at least one task score and the corresponding confidence score.

In accordance with an exemplary embodiment, the processor may be further configured to generate at least one graphical element for the at least one predictive output, each of the at least one graphical element may relate to a graphical representation of the at least one predictive output; and display, via the graphical user interface, the at least one graphical element in response to the at least one request.

In accordance with an exemplary embodiment, prior to the computing of the at least one predictive output, the processor may be further configured to determine whether the confidence score satisfies a predetermined threshold; and identify at least one set of adjacent scores based on an adjacency between each of the at least one task score, the at least one set of adjacent scores may be determined when the confidence score is less than the predetermined threshold.

In accordance with an exemplary embodiment, the processor may be further configured to determine, by using a third model, an adjacency probability value for each of the at least one set of adjacent scores; and compute the at least one predictive output for each of the at least one task based on the corresponding at least one task score, the corresponding confidence score, and the corresponding adjacency probability value.

In accordance with an exemplary embodiment, the at least one predictive output may include the at least one task score, the confidence score, the adjacency probability value, and reference data, the reference data may relate to contextual information for the at least one task score, the confidence score, and the adjacency probability value.

In accordance with an exemplary embodiment, each of the first model, the second model, and the third model may include at least one from among a large language model, a deep learning model, a neural network model, a natural language processing model, a machine learning model, a mathematical model, and a process model.

In accordance with an exemplary embodiment, to generate the at least one structured data set, the processor may be further configured to encode the raw data to represent at least one categorical variable as a corresponding numerical value; vectorize the encoded raw data into at least one number vector; scale each of the at least one number vector to calculate a corresponding distance between a plurality of data points; and perform principal component analysis for each of the at least one scaled number vector.

In accordance with an exemplary embodiment, the at least one task may relate to a software development requirement that is written from a perspective of an end user, the software development requirement may include at least one subtask.

In accordance with an exemplary embodiment, the processor may be further configured to aggregate the raw data from an issue tracking development platform, the raw data may include at least one from among historical project data, project attribute data, and team performance data.

According to an aspect of the present disclosure, a non-transitory computer readable storage medium storing instructions for facilitating automated scoring of software development tasks by using predictive analytics is disclosed. The storage medium including executable code which, when executed by a processor, may cause the processor to receive, via a graphical user interface, at least one request, each of the at least one request may include a search request for at least one task; aggregate raw data that corresponds to the at least one task, the raw data may include information in a natural language format; generate at least one structured data set from the raw data based on at least one predetermined parameter; determine, by using a first model, at least one task score for each of the at least one task based on the at least one structured data set; determine, by using a second model, a confidence score for each of the at least one task score; and compute at least one predictive output for each of the at least one task based on the corresponding at least one task score and the corresponding confidence score.

In accordance with an exemplary embodiment, when executed by the processor, the executable code may further cause the processor to generate at least one graphical element for the at least one predictive output, each of the at least one graphical element may relate to a graphical representation of the at least one predictive output; and display, via the graphical user interface, the at least one graphical element in response to the at least one request.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
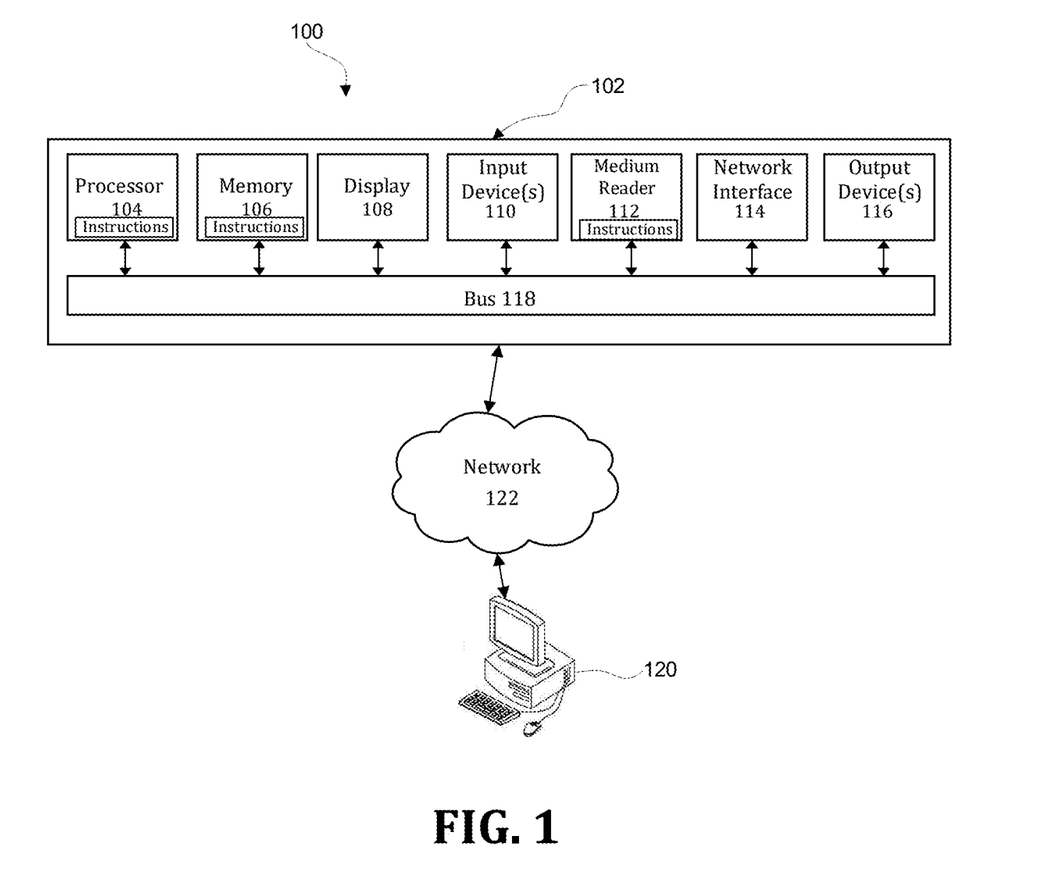
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for enhancing project planning and execution by leveraging artificial intelligence to facilitate automated scoring of development tasks.

Figure 2:
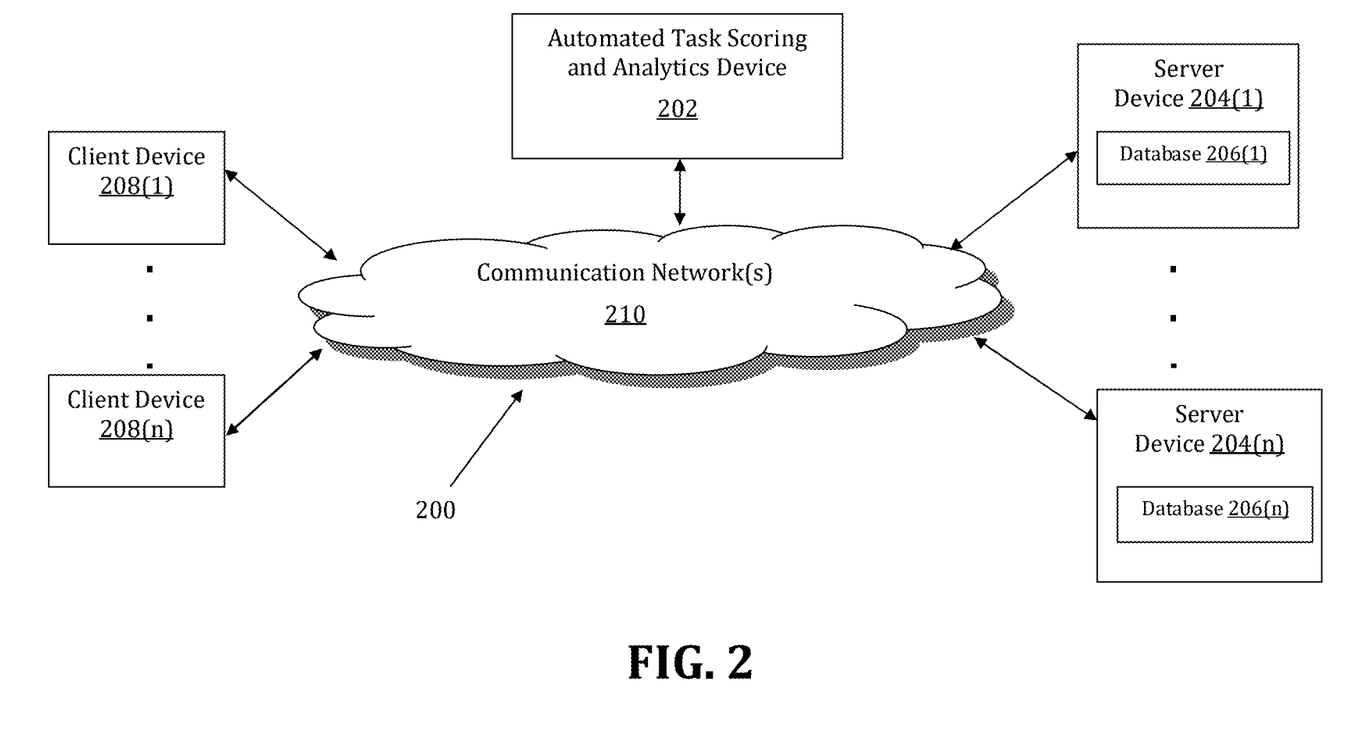
FIG. 2 illustrates an exemplary diagram of a network environment.

Referring to FIG. 2, a schematic of an exemplary network environment 200 for implementing a method for enhancing project planning and execution by leveraging artificial intelligence to facilitate automated scoring of development tasks is illustrated. In an exemplary embodiment, the method is executable on any networked computer platform, such as, for example, a personal computer (PC).

The method for enhancing project planning and execution by leveraging artificial intelligence to facilitate automated scoring of development tasks may be implemented by an Automated Task Scoring and Analytics (ATSA) device 202. The ATSA device 202 may be the same or similar to the computer system 102 as described with respect to FIG. 1. The ATSA device 202 may store one or more applications that can include executable instructions that, when executed by the ATSA device 202, cause the ATSA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ATSA device 202 itself, may be located in virtual server(s) running in a cloud-based computing environment rather than being tied to one or more specific physical network computing devices. Also, the application(s) may be running in one or more virtual machines (VMs) executing on the ATSA device 202. Additionally, in one or more embodiments of this technology, virtual machine(s) running on the ATSA device 202 may be managed or supervised by a hypervisor.

In the network environment 200 of FIG. 2, the ATSA device 202 is coupled to a plurality of server devices 204(1)-204(n) that hosts a plurality of databases 206(1)-206(n), and also to a plurality of client devices 208(1)-208(n) via communication network(s) 210. A communication interface of the ATSA device 202, such as the network interface 114 of the computer system 102 of FIG. 1, operatively couples and communicates between the ATSA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ATSA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ATSA devices that efficiently implement a method for enhancing project planning and execution by leveraging artificial intelligence to facilitate automated scoring of development tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ATSA device 202 may be a standalone device or integrated with one or more other devices or apparatuses, such as one or more of the server devices 204(1)-204(n), for example. In one particular example, the ATSA device 202 may include or be hosted by one of the server devices 204(1)-204(n), and other arrangements are also possible. Moreover, one or more of the devices of the ATSA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ATSA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to requests, search requests, tasks, raw data, natural language data, structured data sets, predetermined parameters, machine learning models, task scores, confidence scores, predictive outputs, and adjacency probability values.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ATSA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ATSA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ATSA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ATSA device 202, the server devices 204(1)-204(n), or the client devices 208(1)-208(n), for example, may be configured to operate as virtual instances on the same physical machine. In other words, one or more of the ATSA device 202, the server devices 204(1)-204(n), or the client devices 208(1)-208(n) may operate on the same physical device rather than as separate devices communicating through communication network(s) 210. Additionally, there may be more or fewer ATSA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
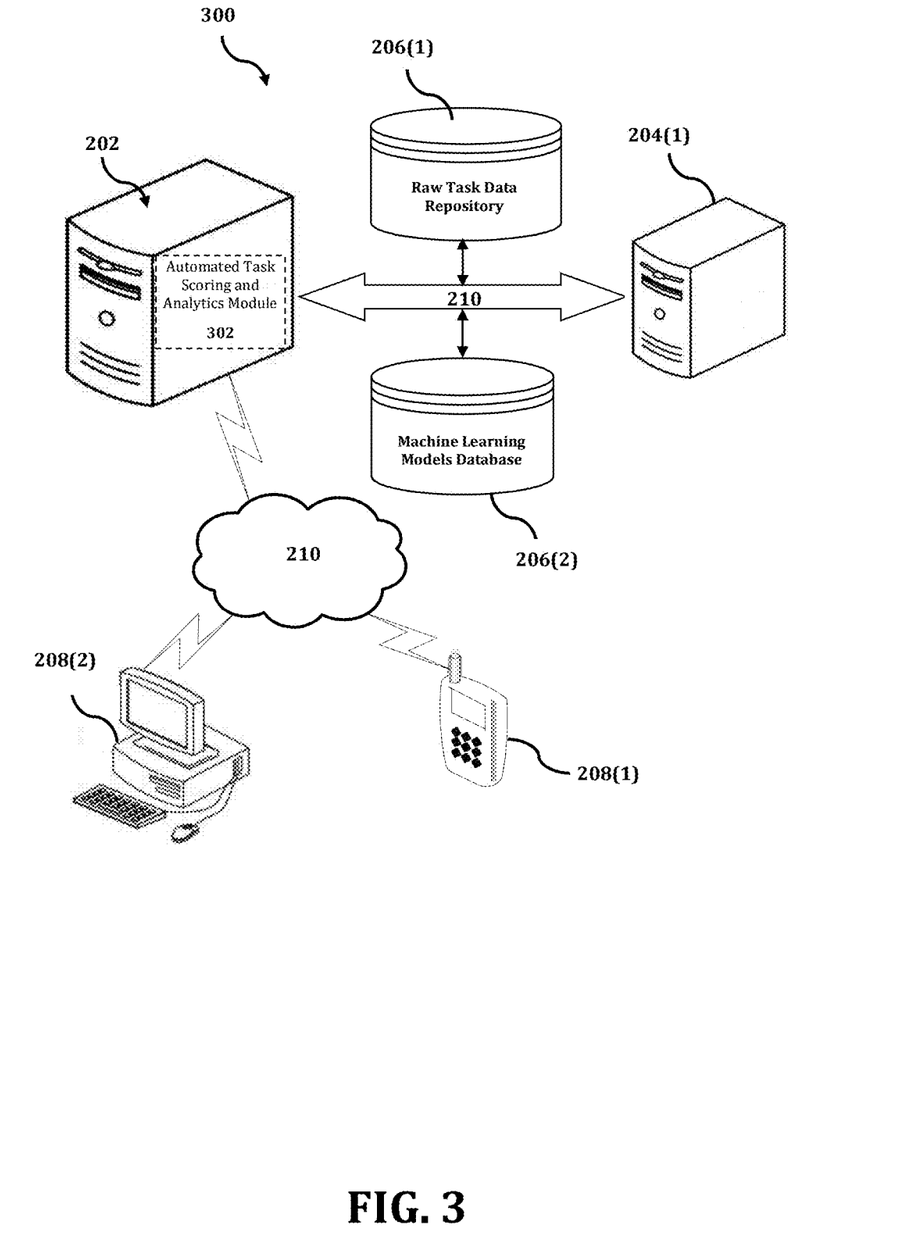
FIG. 3 shows an exemplary system for implementing a method for enhancing project planning and execution by leveraging artificial intelligence to facilitate automated scoring of development tasks.

The ATSA device 202 is described and shown in FIG. 3 as including an automated task scoring and analytics module 302, although it may include other rules, policies, modules, databases, or applications, for example. As will be described below, the automated task scoring and analytics module 302 is configured to implement a method for enhancing project planning and execution by leveraging artificial intelligence to facilitate automated scoring of development tasks.

An exemplary process 300 for implementing a mechanism for enhancing project planning and execution by leveraging artificial intelligence to facilitate automated scoring of development tasks by utilizing the network environment of FIG. 2 is shown as being executed in FIG. 3. Specifically, a first client device 208(1) and a second client device 208(2) are illustrated as being in communication with ATSA device 202. In this regard, the first client device 208(1) and the second client device 208(2) may be "clients" of the ATSA device 202 and are described herein as such. Nevertheless, it is to be known and understood that the first client device 208(1) and/or the second client device 208(2) need not necessarily be "clients" of the ATSA device 202, or any entity described in association therewith herein. Any additional or alternative relationship may exist between either or both of the first client device 208(1) and the second client device 208(2) and the ATSA device 202, or no relationship may exist.

Further, ATSA device 202 is illustrated as being able to access a raw task data repository 206(1) and a machine learning models database 206(2). The automated task scoring and analytics module 302 may be configured to access these databases for implementing a method for enhancing project planning and execution by leveraging artificial intelligence to facilitate automated scoring of development tasks.

The first client device 208(1) may be, for example, a smart phone. Of course, the first client device 208(1) may be any additional device described herein. The second client device 208(2) may be, for example, a PC. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ATSA device 202 via broadband or cellular communication. Of course, these embodiments are merely exemplary and are not limiting or exhaustive.

Upon being started, the automated task scoring and analytics module 302 executes a process for enhancing project planning and execution by leveraging artificial intelligence to facilitate automated scoring of development tasks. An exemplary process for enhancing project planning and execution by leveraging artificial intelligence to facilitate automated scoring of development tasks is generally indicated at flowchart 400 in FIG. 4.

Figure 4:
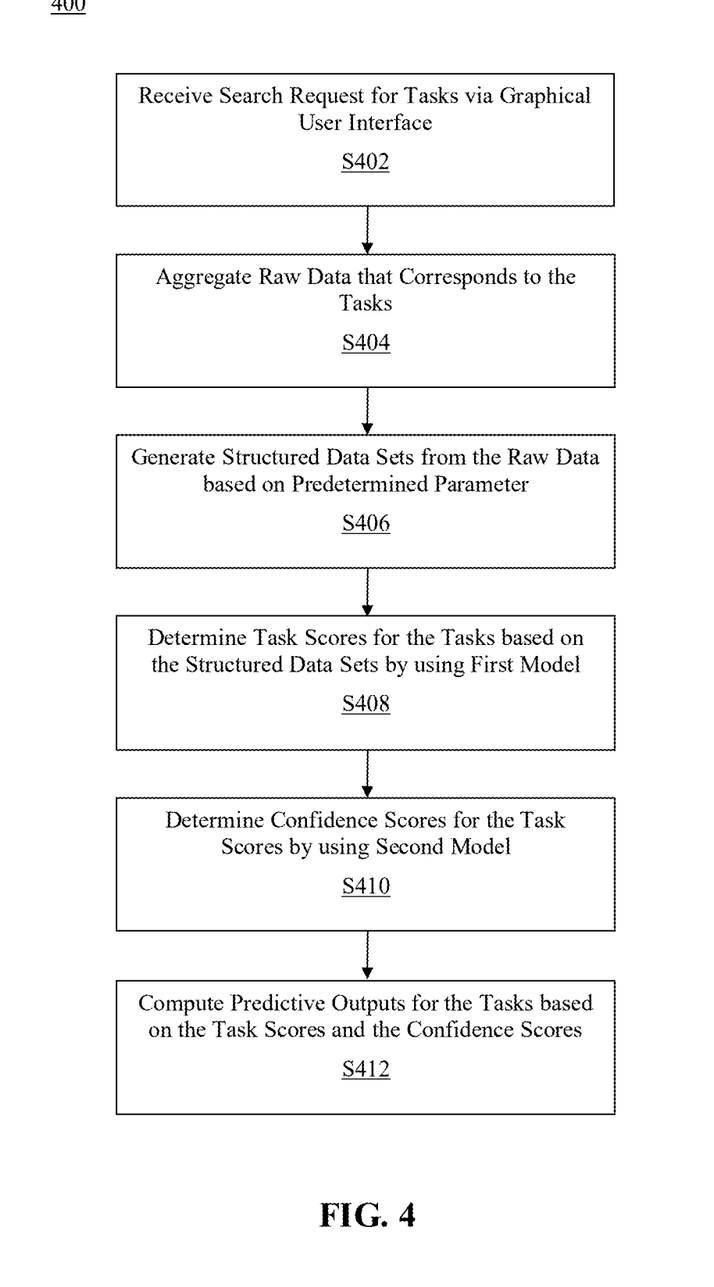
FIG. 4 is a flowchart of an exemplary process for implementing a method for enhancing project planning and execution by leveraging artificial intelligence to facilitate automated scoring of development tasks.

In the process 400 of FIG. 4, at step S402, requests may be received from a user via a graphical user interface. The requests may include a search request for tasks such as, for example, software development tasks. In an exemplary embodiment, the requests may include any number of inputs from a user that was received via the graphical user interface. The requests may relate to instructions for a computing component that provides information such as, for example, task data for further processing. For example, the user may provide a task identifier as part of a search request for a corresponding task. The requests may include a function such as, for example, a search function that is usable to identify information in a computing environment. The function may initiate subsequent processes such as, for example, a point estimation process for the provided tasks consistent with present disclosures.

In another exemplary embodiment, the graphical user interface may correspond to a type of user interface that enables the user to interact with computing components through graphical icons. The graphical user interface may be implemented with graphical icons such as, for example, windows and menus to enable the user to carry out commands such as, for example, to search for a particular task for further analysis. In another exemplary embodiment, the graphical user interface may include search and filter capabilities. The search capabilities may include an ability to predict tasks based on received task issue keys, sprint identifiers, and team identifiers. The filter capabilities may include an ability to filter tasks by development team members.

In another exemplary embodiment, the tasks may relate to software development requirements such as, for example, user stories that are written from a perspective of an end user. The user stories may be regarded as a simple narrative that provides development requirements for software projects. The software development requirements may include a grouping of various subtasks. Conversely, the software development requirements may be grouped into larger bodies of work such as, for example, project epics with other software development requirements that share a common characteristic such as, for example, a common project goal.

At step S404, raw data that corresponds to the tasks may be aggregated. The raw data may include information in a natural language format. In an exemplary embodiment, the raw data may relate to unstructured data that has not been processed for consumption by the disclosed invention. The raw data may include values in a variety of data formats. The values may include characters such as, for example, numeric characters, alphabetic characters, and symbolic characters.

In another exemplary embodiment, the raw data may be aggregated from a plurality of sources such as, for example, first-party data sources as well as third party data sources. The raw data may be automatically aggregated via an application programming interface as well as manually inputted by a user via the graphical user interface.

In another exemplary embodiment, the raw data may be aggregated from an issue tracking development platform that is usable for management of development projects. The issue tracking development platform may enable software developers to plan, track, and resolve issues that arise during the software development process. Consistent with present disclosures, the raw data may include any information that relates to the development projects such as, for example, user story data. The raw data may also include at least one from among historical project data, project attribute data, and team performance data. The historical project data may include completed user stories, corresponding point assignments, and a time taken to complete the user stories.

At step S406, structured data sets may be generated from the raw data based on predetermined parameters. In an exemplary embodiment, the structured data sets may relate to data that have been processed for consumption by the disclosed invention. The structured data sets may organize the raw data into a predetermined format based on the predetermined parameters. The predetermined parameters may define a particular data type for the structured data sets as well as define the protocol for converting the raw data into the particular data type.

In another exemplary embodiment, the generating of the structured data sets may include a first step that encodes the raw data, a second step that vectorizes the encoded data, a third step that scales number vectors, and a fourth step that performs principal component analysis. In the first step, the raw data is encoded to represent categorical variables as a corresponding numerical value. The encoding may be facilitated by an encoding technique such as, for example, a one hot encoding technique that converts categorical data variables for input in machine learning algorithms.

In the second step, the encoded raw data may be vectorized into a plurality of number vectors. The encoded raw data may be converted into vectors of real numbers that are supported by machine learning algorithms. The vectorizing of the encoded raw data may facilitate extraction of distinct features from the raw data.

In the third step, each of the number vectors are scaled to calculate a corresponding distance between a plurality of data points. The scaling process may relate to feature scaling, which is essential for machine learning algorithms. The scaling process may facilitate meaningful comparisons between features to improve model convergence and prevent certain features from overshadowing others.

In the fourth step, principal component analysis may be performed for each of the scaled number vectors. The principal component analysis process may relate to an unsupervised learning technique that is usable to reduce dimensionality of data. The principal component analysis process may increase interpretability while minimizing information loss. The principal component analysis process may identify significant features in a data set as well as identify sequences of linear combinations of variables.

At step S408, task scores may be determined for each of the tasks based on the structured data sets. The task scores may be automatically determined for each of the tasks by using a first model. In an exemplary embodiment, the task scores may relate to points that have been assigned to the tasks. The points may correspond to units of measurement for expressing an estimate of the overall effort required to fully implement a task such as, for example, a product backlog item. The points may provide an estimate of overall effort as a function of task difficulty and not simply time spent on the task.

In another exemplary embodiment, the first model may utilize the structured data sets to identify patterns and correlations that are usable to estimate the task scores for each of the tasks. The first model may provide consistent objective estimations that produces similar predictions every time for tasks with similar features. The task scores may provide a baseline that does not include any biases. For example, a random forest classifier may be implemented as the first model. The random forest classifier may output a list of probabilities that correspond to a percentage of decision trees in the random forest which voted for each task.

In another exemplary embodiment, the first model may include at least one from among a large language model, a deep learning model, a neural network model, a natural language processing model, a machine learning model, a mathematical model, and a process model. The first model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the machine learning process may include a neural network that relates to at least one from among an artificial neural network and a simulated neural network. The neural network may correspond to a technique in artificial intelligence that teaches computers to process data by using interconnected processing nodes and/or artificial neurons. The neural network may relate to a type of machine learning such as, for example, deep learning that uses interconnected nodes and/or artificial neurons in a layered structure to transform inputs for predictive analytics.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the large language model may relate to a trained deep-learning model that understands and generates text in a human-like fashion. The large language model may recognize, summarize, translate, predict, and generate various types of text as well as content based on knowledge gained from massive data sets. In another exemplary embodiment, the large language model may correspond to a language model that consists of a neural network with many parameters such as, for example, weights. The language model may be trained on large quantities of unlabeled and labeled text by using self-supervised learning or semi-supervised learning. The trained language model may be usable to capture syntax and semantics of human language.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S410, confidence scores may be determined for each of the task scores. The confidence scores may be automatically determined for the task scores by using a second model. In an exemplary embodiment, the confidence scores may correspond to a value that represents a level of confidence in the determined task scores. For example, the second model may be able to determine that the task scores are more or less likely to be right and assign a high confidence score. The confidence scores may represent a predicted accuracy of the determined task scores.

In another exemplary embodiment, the second model may relate to a meta model that has been trained with the output of the base model, i.e., the first model. The meta model may be trained to consider the distribution of the probabilities generated by the first model. Given the base input, the meta model may be tasked with predicting how likely is it that a prediction from the base model is correct. The meta model may be able to learn about how the base model has learned to gain additional insight into a prediction's accuracy based on the structure of the base model output.

In another exemplary embodiment, variations in the confidence scores may be identified and analyzed to assist user decision making. To facilitate the analysis, a determination may be made as to whether the confidence scores satisfy a predetermined threshold. The predetermined threshold may be usable for comparison with the determined confidence scores to identify a level of confidence for the task scores. The predetermined threshold may include values that are usable to determine whether there is a low level of confidence, a medium level of confidence, or a high level of confidence for the task scores based on the determined confidence scores. The predetermined threshold may be adjustable by the user via the graphical user interface as well as dynamically adjusted by using the second model without additional user input.

Additionally, sets of adjacent scores may be identified to facilitate the analysis. The sets of adjacent scores may be identified based on an adjacency between each of the task scores. For example, the sets of adjacent scores may include a first set for scores 1 and 2, a second set for scores 2 and 3, etc. The sets of adjacent scores may be determined for particular instances of confidence variation such as, for example, when the confidence scores are less than the predetermined threshold. For example, the sets of adjacent scores may be determined when the confidence scores indicate that there is a low level of confidence for the determined task scores.

Then, adjacency probability values may be determined for each of the sets of adjacent scores. The adjacency probability values may be automatically determined by using a third model. For example, the adjacency probability values may be determined for the first set for scores 1 and 2, the second set for scores 2 and 3, etc. The adjacency probability values may relate to a level of confidence for the sets of adjacent scores. For example, while the level of confidence for each of scores 1 and 2 is low, the adjacency probability values may indicate that the level of confidence in the set of scores 1 and 2 is high. In another example, while there is indecision between adjacent scores 1 and 2 for a particular development task, there is a high level of confidence that the task score for that particular development task is either 1 or 2. Consistent with present disclosures, the adjacency probability values may be usable to compute predictive outputs for each of the tasks.

In another exemplary embodiment, the third model may include any number of adjacency models that are trained on the output of the base model. The number of adjacency models may correspond to the number of possible adjacencies between the task scores. Each of the adjacency models may be tasked with predicting how likely a user story is to be in one of the classes based on the assigned adjacency. For example, an adjacency model for adjacent scores 1 and 2 accepts the output of the base model and predicts how likely is it that the user story score is a 1 or 2. When the base model indicates that there is low confidence in a prediction, all adjacency models may be checked to see whether there is high confidence in particular adjacent scores. When there is a high confidence in the particular adjacent scores, the particular adjacent scores may be reported to the user along with the low confidence prediction.

In another exemplary embodiment, consistent with present disclosures, the second model and the third model may include at least one from among a large language model, a deep learning model, a neural network model, a natural language processing model, a machine learning model, a mathematical model, and a process model.

At step S412, predictive outputs may be computed for each of the tasks based on the corresponding task scores and the corresponding confidence scores. In an exemplary embodiment, the predictive outputs may include the task scores, the confidence scores, the adjacency probability values, and reference data. The reference data may relate to contextual information for the task scores, the confidence scores, and the adjacency probability values. The contextual information may provide a logical basis for the determined task scores, confidence scores, and the adjacency probability values.

In another exemplary embodiment, data visualizations may be provided for the user via the graphical user interface. For example, the data visualizations may include leadership data visualizations for decision makers that provide information relating to team performance and user story point performance. To facilitate the visualizations, graphical elements may be generated for the predictive outputs. The graphical elements may relate to graphical representations of data in the predictive outputs. The graphical elements may include visual representations such as, for example, tables and charts that organize the data in the predictive outputs for presentation on the graphical user interface. The graphical elements may indicate relationships, hierarchies, and visually emphasize data in the predictive outputs.

Then, the graphical elements may be displayed on the graphical user interface for the user. The graphical elements may be displayed for the user in response to the received requests. For example, the user may request point estimations for a particular development task via inputs on the graphical user interface and receive the response as graphical elements that are displayed on the graphical user interface. Consistent with present disclosures, the graphical user interface may include a retrospective prediction mode that provides an option to view predictions retrospectively. A prediction display on the graphical user interface may show both predicted and actual points for each of the tasks. The prediction display may also show overall data summarizing trends in the deviation between predicted and actual points. Likewise, the prediction display may provide project time estimations that predict how long a project will take as well as required resources for the project.

In another exemplary embodiment, the predictive outputs may be provided to a downstream computing component such as, for example, a downstream application via an application programming interface. The predictive outputs may be provided to the downstream application to facilitate additional downstream tasks. For example, the predictive outputs may be provided to a downstream development platform that enables administrative tracking of software development tasks based on the predictive outputs.

In another exemplary embodiment, the applications described in the present disclosure may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

Figure 5:
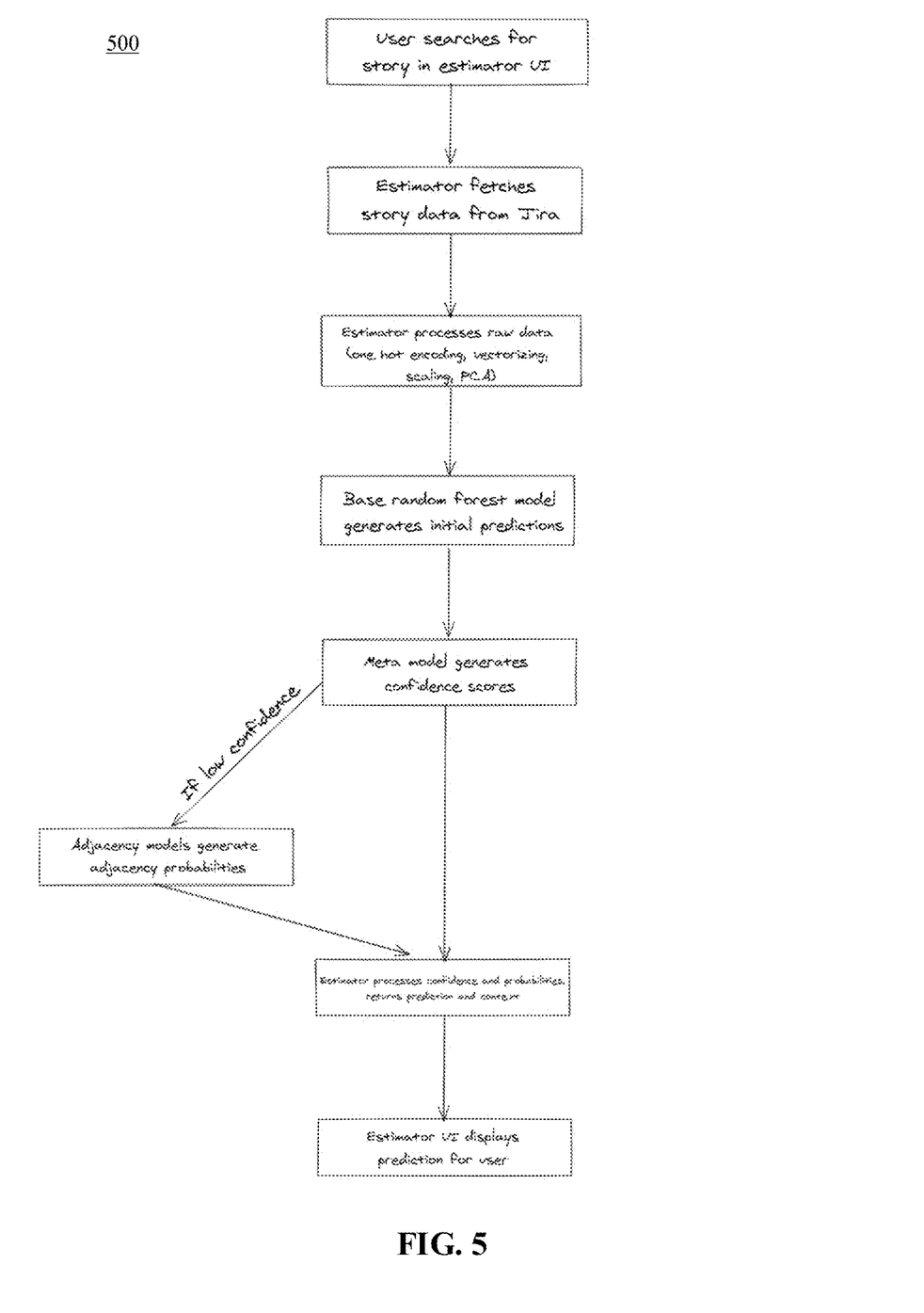
FIG. 5 is an adjacency model flowchart of an exemplary process for implementing a method for enhancing project planning and execution by leveraging artificial intelligence to facilitate automated scoring of development tasks.

FIG. 5 is an adjacency model flowchart 500 of an exemplary process for implementing a method for enhancing project planning and execution by leveraging artificial intelligence to facilitate automated scoring of development tasks. In FIG. 5, an artificial intelligence based system is provided to serve as an intelligent point estimator for development tasks. The point estimator leverages historical project data, team performance data, as well as various other factors to provide accurate and efficient point estimations to enhance the overall project planning an execution process.

As illustrated in FIG. 5, the disclosed system may include a data collection and storage system, a base machine learning model, a meta machine learning model, an estimation engine, and a user interface integration device. The data collection and storage system may collect and store historical project data, which includes completed user stories, corresponding story points, and time taken to complete each story. The data collection and storage system may also capture team performance metrics and relevant project attributes. The base machine learning model may be usable to identify patterns and correlations from the historical project data.

The meta machine learning model may utilize neural networks to learn about the accuracy of predictions made by the base model. The meta machine learning model may provide confidence scores as well as identify possible adjacencies to capture the nondeterministic nature of user point estimations. The estimation engine may utilize the trained machine learning models to predict user story points for new user stories based on corresponding descriptions and relevant features. The estimation engine may consider factors such as, for example, similarity to past stories, team pointing history, and project complexity. The user interface integration device may be usable to seamlessly integrate with various development and issue tracking platforms. The user interface integration device may enable users to generate and view predicted story point estimations within the development and issue tracking platforms.

Accordingly, with this technology, an optimized process for enhancing project planning and execution by leveraging artificial intelligence to facilitate automated scoring of development tasks is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated scoring of software development tasks by using predictive analytics, the method being implemented by at least one processor, the method comprising:

receiving, by the at least one processor via a graphical user interface, at least one request, each of the at least one request including a search request for at least one task;

aggregating, by the at least one processor, raw data that corresponds to the at least one task, the raw data including information in a natural language format;

generating, by the at least one processor, at least one structured data set from the raw data based on at least one predetermined parameter;

determining, by the at least one processor using a first model, at least one task score for each of the at least one task based on the at least one structured data set;

training a second model based on output of the first model corresponding to distribution of probabilities generated by the first model;

determining, by the at least one processor using the second model, a confidence score for each of the at least one task score;

determining, by the at least one processor, whether the confidence score satisfies a predetermined threshold;

identifying, by the at least one processor, at least one set of adjacent scores based on an adjacency between each of the at least one task score, wherein the at least one set of adjacent scores is determined when the confidence score is less than the predetermined threshold;

training a third model based on the output of the first model;

determining, by the at least one processor using the third model, an adjacency probability value for each of the at least one set of adjacent scores;

computing, by the at least one processor, at least one predictive output for each of the at least one task based on the corresponding at least one task score, the corresponding adjacency probability value, and the corresponding confidence score;

transmitting, by the at least one processor via the graphical user interface, the at least one predictive output to a downstream application including a downstream development platform;

tracking the software development tasks based on the at least one predictive output to fulfill a goal of completing development of the software, wherein the downstream application is a microservice application that relates to an event-driven architecture that includes a distributed data streaming platform for publishing, subscribing, storing, and processing of event streams in real time.

2. The method of claim 1, further comprising:

generating, by the at least one processor, at least one graphical element for the at least one predictive output, each of the at least one graphical element relating to a graphical representation of the at least one predictive output; and displaying, by the at least one processor via the graphical user interface, the at least one graphical element in response to the at least one request.

3. The method of claim 1, wherein the at least one predictive output includes the at least one task score, the confidence score, the adjacency probability value, and reference data, the reference data relating to contextual information for the at least one task score, the confidence score, and the adjacency probability value.

4. The method of claim 1, wherein each of the first model, the second model, and the third model includes at least one from among a large language model, a deep learning model, a neural network model, a natural language processing model, a machine learning model, a mathematical model, and a process model.

5. The method of claim 1, wherein the generating of the at least one structured data set further comprises:
encoding, by the at least one processor, the raw data to represent at least one categorical variable as a corresponding numerical value;
vectorizing, by the at least one processor, the encoded raw data into at least one number vector;
scaling, by the at least one processor, each of the at least one number vector to calculate a corresponding distance between a plurality of data points; and
performing, by the at least one processor, principal component analysis for each of the at least one scaled number vector.

6. The method of claim 1, wherein the at least one task relates to a software development requirement that is written from a perspective of an end user, the software development requirement including at least one subtask.

7. The method of claim 1, wherein the raw data is aggregated from an issue tracking development platform, the raw data including at least one from among historical project data, project attribute data, and team performance data.

8. A computing device configured to implement an execution of a method for facilitating automated scoring of software development tasks by using predictive analytics, the computing device comprising:
a processor;
a memory; and
a communication interface coupled to each of the processor and the memory,
wherein the processor is configured to:
receive, via a graphical user interface, at least one request, each of the at least one request including a search request for at least one task;
aggregate raw data that corresponds to the at least one task, the raw data including information in a natural language format;
generate at least one structured data set from the raw data based on at least one predetermined parameter;
determine, by using a first model, at least one task score for each of the at least one task based on the at least one structured data set;
train a second model based on output of the first model corresponding to distribution of probabilities generated by the first model;
determine, by using the trained second model, a confidence score for each of the at least one task score;
determine whether the confidence score satisfies a predetermined threshold;
identify at least one set of adjacent scores based on an adjacency between each of the at least one task score, wherein the at least one set of adjacent scores is determined when the confidence score is less than the predetermined threshold;
train a third model based on the output of the first model;
determine, by using the third model, an adjacency probability value for each of the at least one set of adjacent scores;
compute at least one predictive output for each of the at least one task based on the corresponding at least one task score, the corresponding adjacency probability value, and the corresponding confidence score;
transmit, via the graphical user interface, the at least one predictive output to a downstream application including a downstream development platform; and
track the software development tasks based on the at least one predictive output to fulfill a goal of completing development of the software,
wherein the downstream application is a microservice application that relates to an event-driven architecture that includes a distributed data streaming platform for publishing, subscribing, storing, and processing of event streams in real time.

9. The computing device of claim 8, wherein the processor is further configured to:
generate at least one graphical element for the at least one predictive output, each of the at least one graphical element relating to a graphical representation of the at least one predictive output; and
display, via the graphical user interface, the at least one graphical element in response to the at least one request.

10. The computing device of claim 8, wherein the at least one predictive output includes the at least one task score, the confidence score, the adjacency probability value, and reference data, the reference data relating to contextual information for the at least one task score, the confidence score, and the adjacency probability value.

11. The computing device of claim 8, wherein each of the first model, the second model, and the third model includes at least one from among a large language model, a deep learning model, a neural network model, a natural language processing model, a machine learning model, a mathematical model, and a process model.

12. The computing device of claim 8, wherein, to generate the at least one structured data set, the processor is further configured to:
encode the raw data to represent at least one categorical variable as a corresponding numerical value;
vectorize the encoded raw data into at least one number vector;
scale each of the at least one number vector to calculate a corresponding distance between a plurality of data points; and
perform principal component analysis for each of the at least one scaled number vector.

13. The computing device of claim 8, wherein the at least one task relates to a software development requirement that is written from a perspective of an end user, the software development requirement including at least one subtask.

14. The computing device of claim 8, wherein the processor is further configured to aggregate the raw data from an issue tracking development platform, the raw data including at least one from among historical project data, project attribute data, and team performance data.

15. A non-transitory computer readable storage medium storing instructions for facilitating automated scoring of software development tasks by using predictive analytics, the storage medium comprising executable code which, when executed by a processor, causes the processor to:

receive, via a graphical user interface, at least one request, each of the at least one request including a search request for at least one task;
aggregate raw data that corresponds to the at least one task, the raw data including information in a natural language format;
generate at least one structured data set from the raw data based on at least one predetermined parameter;
determine, by using a first model, at least one task score for each of the at least one task based on the at least one structured data set;
train a second model based on output of the first model corresponding to distribution of probabilities generated by the first model;
determine, by using the trained second model, a confidence score for each of the at least one task score;
determine whether the confidence score satisfies a predetermined threshold;
identify at least one set of adjacent scores based on an adjacency between each of the at least one task score, wherein the at least one set of adjacent scores is determined when the confidence score is less than the predetermined threshold;
train a third model based on the output of the first model;
determine, by using the third model, an adjacency probability value for each of the at least one set of adjacent scores;
compute at least one predictive output for each of the at least one task based on the corresponding at least one task score, the corresponding adjacency probability value, and the corresponding confidence score;
transmitting, via the graphical user interface, the at least one predictive output to a downstream application including a downstream development platform; and
tracking the software development tasks based on the at least one predictive output to fulfill a goal of completing development of the software,
wherein the downstream application is a microservice application that relates to an event-driven architecture that includes a distributed data streaming platform for publishing, subscribing, storing, and processing of event streams in real time.

16. The storage medium of claim 15, wherein, when executed by the processor, the executable code further causes the processor to:
generate at least one graphical element for the at least one predictive output, each of the at least one graphical element relating to a graphical representation of the at least one predictive output; and
display, via the graphical user interface, the at least one graphical element in response to the at least one request.

17. The storage medium of claim 15, wherein the at least one predictive output includes the at least one task score, the confidence score, the adjacency probability value, and reference data, the reference data relating to contextual information for the at least one task score, the confidence score, and the adjacency probability value.

18. The storage medium of claim 15, wherein each of the first model, the second model, and the third model includes at least one from among a large language model, a deep learning model, a neural network model, a natural language processing model, a machine learning model, a mathematical model, and a process model.

19. The storage medium of claim 15, wherein, to generate the at least one structured data set, the executable code which, when executed by the processor, causes the processor to:
encode the raw data to represent at least one categorical variable as a corresponding numerical value;
vectorize the encoded raw data into at least one number vector;
scale each of the at least one number vector to calculate a corresponding distance between a plurality of data points; and
perform principal component analysis for each of the at least one scaled number vector.

20. The storage medium of claim 15, wherein the at least one task relates to a software development requirement that is written from a perspective of an end user, the software development requirement including at least one subtask.

* * * * *